C. LETTERMAN,

Assignor to C. S. TROWBRIDGE & G. P. ROSEBOOM.

Grooving Sheet Metal Pipe.

No. 9,343. Reissued Aug. 17, 1880.

Chas. J. Buchheit.
Edw. J. Brady. } Witnesses

Charles Letterman Inventor.
By Wilhelm & Bonner.
Attorneys.

UNITED STATES PATENT OFFICE.

CHARLES LETTERMAN, OF SYRACUSE, ASSIGNOR TO CHARLES S. TROWBRIDGE AND GARRET P. ROSEBOOM, BOTH OF AUBURN, NEW YORK.

GROOVING SHEET-METAL PIPES.

SPECIFICATION forming part of Reissued Letters Patent No. 9,343, dated August 17, 1880.

Original No. 213,214, dated March 11, 1879. Application for reissue filed July 9, 1880.

*To all whom it may concern:*

Be it known that I, CHARLES LETTERMAN, of Syracuse, in the county of Onondaga and State of New York, have invented new and useful Improvements in Machines for Grooving Sheet-Metal Pipes, of which the following is a specification, reference being had to the accompanying drawings.

The object of my invention is the construction of a simple and efficient machine for bending screw-threads on stove-pipes and other sheet-metal pipes, whereby such pipes are enabled to be readily secured together, or to be separated, as circumstances may require.

My invention consists in the combination and arrangement of the several parts which constitute my improved machine, as will be hereinafter fully set forth.

Figure 1:
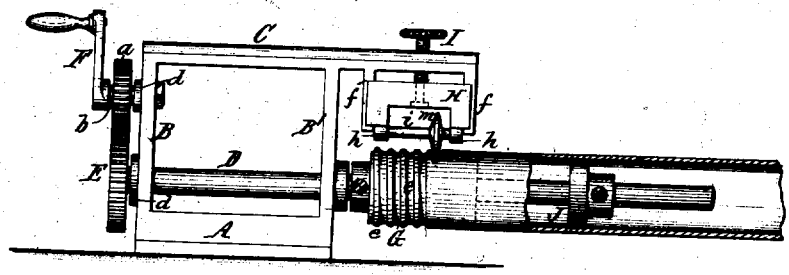
Figure 2:
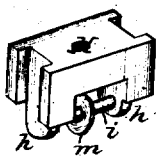

In the accompanying drawings, Figure 1 is a side elevation of my improved machine. Fig. 2 is a perspective view of the carrier to which the circular die is attached.

Like letters of reference refer to similar parts in both figures.

A represents the base of the machine, and B B′ two standards rising therefrom, and connected at their upper ends by a cross-bar, C, which extends beyond the standard B′. This frame may be constructed of cast-iron, in one piece, or in any other convenient manner.

D is a horizontal shaft turning in bearings in the standards B E, and provided at one end with a gear-wheel, E, which is driven by a pinion, *a*. The latter is mounted on a shaft, *b*, having its bearing in the standard B, and provided with a crank, F, for rotating the pinion *a*, thereby imparting motion to the shaft D. At the points where the shafts *b* and D pass through the standards the latter are preferably provided with projecting hubs, as shown at *d*, to form elongated bearings for the shafts.

G is a cylindrical die, secured to the shaft D on the outside of the standard B′, and having a screw-thread, *e*, formed upon its periphery, of the size and form which is intended to be formed in the pipe, the die being made of a diameter corresponding with that of the pipe which is to be threaded. The die G is fastened to the shaft D by a set-screw, or otherwise, so as to be readily removed and another of different size substituted, according to the size of the pipe to be operated upon.

The cross-bar C of the frame is projected over the die G, and is provided with two downwardly-projecting bars, *f f*, between which is placed a slide, H, adjustable up and down by means of a set-screw, I. The slide H is, on its under side, provided with two ears or projections, *h h*, in which is fastened a rod or shaft, *i*, parallel with the axis of the cylindrical die G. On this rod is loosely placed a wheel or roller, *m*, of such size as to correspond with the thread *e* in the die G.

Upon the projecting end of the mandrel D is placed an adjustable collar, J, fastened at any point by a set-screw or otherwise. This collar is simply intended to hold the pipe in proper position—that is, concentric with the shaft and die.

The pipe being passed over the collar J, and its inner end fitting over the die G, the slide H is pressed down by the set-screw I until the roller *m* indents the pipe by pressing it down in the thread *e* on the die. By now turning the crank F the mandrel D and die G, with the pipe, will be rotated, and the roller *m*, being loose on its shaft *i*, will follow the thread on the die G, and thus form a coarse thread on the pipe.

I claim—

1. In a machine for bending screw-threads on sheet-metal pipes, the combination, with a rotating cylindrical die provided with a peripheral screw-thread, of a circular die arranged to rotate in the same plane and capable of movement in a line with its axis, so as to engage with and follow the thread of the cylindrical die.

2. In a machine for bending screw-threads on sheet-metal pipes, the combination, with a rotating cylindrical die provided with a peripheral screw-thread, of a circular die arranged to rotate in the same plane and capable of movement in a line with its axis, so as to engage with and follow the screw-thread of the cylindrical die, and means whereby the circular die may be adjusted toward or from the threaded die.

3. The combination, with a rotating cylindrical die provided with a peripheral screw-thread, of a circular die placed loosely on a shaft arranged parallel with the axis of the cylindrical die.

4. The combination, with a rotating cylindrical die provided with a peripheral screw-thread, of the adjustable carrier H, supporting the shaft *i* and the circular die *m* mounted thereon.

CHARLES LETTERMAN.

Witnesses:
GEO. N. LOUNSBURY,
C. S. TROWBRIDGE.